United States Patent
Petersen et al.

[15] 3,664,949
[45] May 23, 1972

[54] PLATINUM REFORMING WITH A MORDENITE CONTAINING SUPPORT USING TWO REACTORS

[72] Inventors: Richard D. Petersen, Valparaiso, Ind.; Allen, A. Kozinski, Madison, Wis.

[73] Assignee: Standard Oil Company, Chicago, Ill.

[22] Filed: Nov. 10, 1969

[21] Appl. No.: 875,322

[52] U.S. Cl. ............................................208/65, 208/138
[51] Int. Cl. ....................................C10g 35/08, C10g 39/00
[58] Field of Search ...................................208/65, 138, 139

[56] References Cited

UNITED STATES PATENTS

| | | | |
|---|---|---|---|
| 2,943,998 | 7/1960 | Decker | 208/65 |
| 3,198,727 | 8/1965 | Lifland | 208/65 |
| 3,374,167 | 3/1968 | Craig et al. | 208/65 |
| 3,376,214 | 4/1968 | Bertolacini et al. | 208/138 |
| 3,376,215 | 4/1968 | Bertolacini et al. | 208/138 |

*Primary Examiner*—Herbert Levine
*Attorney*—Arthur G. Gilkes, William T. McClain and James L. Wilson

[57] ABSTRACT

The process comprises contacting a petroleum hydrocarbon feedstock in a reactor system in the presence of hydrogen and under reforming conditions with a catalyst comprising a Group VIII metal, mordenite, and an adsorbent refractory inorganic oxide, such as catalytically active alumina. The reactor system is composed of a maximum number of two reactors. The preferred feedstock contains relatively high concentrations of aromatics and/or naphthenes. The above-described catalyst is the sole catalyst in said reactor system. The process employs a weight hourly space velocity of at least 5. The process produces high yields of aromatics and gasolines having high octane numbers.

23 Claims, 1 Drawing Figure

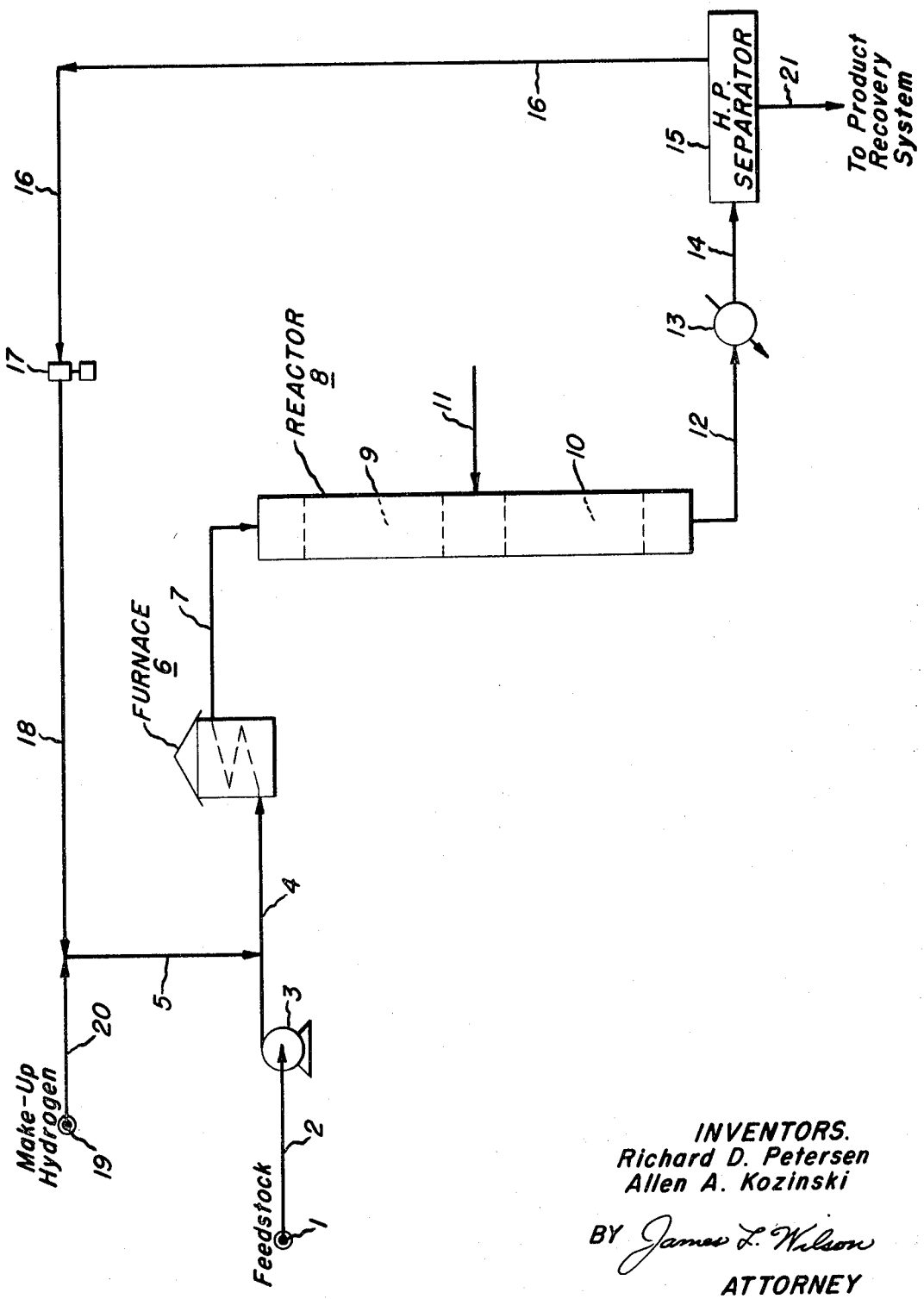

PLATINUM REFORMING WITH A MORDENITE CONTAINING SUPPORT USING TWO REACTORS

BACKGROUND OF THE INVENTION

The present invention is related to a hydrocarbon conversion process. More particularly, it is related to a process for reforming petroleum hydrocarbon feedstocks wherein there is employed a maximum of two reactors, a catalyst that contains a mordenite-structure aluminosilicate material, and a weight hourly space velocity (WHSV) that is greater than those normally employed in conventional petroleum reforming processes.

Low-octane petroleum hydrocarbon naphthas have been converted under reforming conditions with platinum-alumina-halide catalysts into gasoline blending components having high anti-knock ratings. Typically, in such prior reforming processes, the platinum-alumina-halide catalyst is contacted with a mixture of a hydrogen-containing gas and a petroleum hydrocarbon feedstock which has been treated previously to remove nitrogen and sulfur compounds. Such reforming reactions are carried out at a temperature within the range of about 800° F. to about 1,000° F., a total pressure within the range of about 50 psig to about 1,000 psig, and a recycle gas rate within the range of about 2,000 to about 10,000 standard cubic feet of gas per barrel of feedstock (SCFB). Hydrogen makes up more than 50 percent of the hydrogen-containing recycle gas used therein. The WHSV is typically no greater than 2 to 3 weight units of hydrocarbon per hour per weight unit of catalyst.

An improved reforming process has been developed whereby very high yields of aromatics and gasolines having high octane numbers are produced. This improved process employs a reactor system having a maximum of two reactors; a catalyst comprising a Group VIII metal, mordenite-structure aluminosilicate material, and an adsorbent refractory inorganic oxide; and a WHSV that is greater than that found in the typical petroleum hydrocarbon reforming process.

SUMMARY OF THE INVENTION

An improved process for reforming petroleum hydrocarbon feedstocks has been developed. Broadly, this reforming process comprises contacting a petroleum hydrocarbon feedstock in a reactor system in the presence of a hydrogen-containing gas and under reforming conditions with a catalyst comprising a Group VIII metal, mordenite-structure aluminosilicate material, and an adsorbent refractory inorganic oxide to produce a very high yield or aromatics. Preferably, the feedstock has a relatively high concentration of a member selected from the group consisting of aromatics, naphthenes, and mixtures thereof. The preferred Group VIII metal is platinum and the preferred refractory inorganic oxide is catalytically active alumina. A maximum of two reactors is employed in the reactor system. The reactor system, whether consisting of one reactor or two reactors, contains only the one catalyst. The catalyst may also comprise a halide, for example, chloride. The WHSV employed in this improved process is at least 5.

BRIEF DESCRIPTION OF THE DRAWING

The accompanying FIGURE presents a simplified process flow diagram of a specific embodiment of the process of the present invention.

DESCRIPTION AND PREFERRED EMBODIMENTS

According to the present invention, there is provided an improved process for the reforming of petroleum hydrocarbon fractions to produce high octane blending components and/or chemicals. The product from this process is a satisfactory charge stock for an extraction unit to recover aromatics for use as chemicals or for gasoline blending purposes. A conventional commercial reformer consists of a number of reactors; in general, such number is greater than three. In the case of a regenerative reforming unit, an additional reactor is employed as a swing reactor. Such larger number of reactors and the necessity of periodic catalyst regenerations to produce reformates having high octane numbers results in high investment costs. The process of the present invention is capable of appreciably reducing the investment costs by limiting the number of reactors to a maximum number of two while providing high aromatic yields, less coke, and less polymer than those produced through the use of conventional, regenerative, reforming processes. An example of a conventional, regenerative reforming process is Ultraforming, which is adequately described in U.S. Pat. No. 2,773,014, and in Petroleum Engineer, Vol. XXVI, No. 4, April 1954, at page C-35.

Suitable feedstocks that may be reformed by the process of the present invention are petroleum hydrocarbon distillates that boil within the temperature range of about 120° F. to about 500° F. Typical petroleum hydrocarbon feedstocks that may be reformed by means of the present invention include virgin naphthas, cracked naphthas, catalytic gasolines, and coker naphthas, or mixtures thereof boiling within the range of about 120° F. to about 500° F., and preferably within the range of about 180° F. to about 400° F. The feedstock may contain nitrogen, sulfur and olefinic compounds. Therefore, a feedstock need not be pretreated prior to being reformed in the present process. Preferred feedstocks are those petroleum hydrocarbon fractions that have a relatively high concentration of a member selected from the group consisting of aromatics, naphthenes, and mixtures thereof, coupled with relatively low concentrations of paraffins. In such feedstocks the paraffin concentration would be within the range of about 25 volume percent to about 45 volume percent. Typically, a hydrocracked naphtha would be preferred feedstock.

The operating conditions that are employed in the process of the present invention are: an inlet temperature within the range of about 700° F. to about 1,100° F., preferably, within the range of 850° F. to about 1,050° F.; a pressure ranging from atmospheric to about 1,000 psig, preferably, from about 50 psig to about 500 psig; a WHSV of at least 5 weight units of hydrocarbon per hour per weight unit of catalyst, preferably, a WHSV of at least 9 weight units of hydrocarbon per hour per weight unit of catalyst; and a recycle gas rate within the range of about 1,000 SCFB to about 20,000 SCFB, preferably, from about 3,000 SCFB to about 10,000 SCFB.

The process of the present invention is carried out in a reactor system that contains a maximum number of two reactors. Therefore, the reactor system may contain either one reactor or two reactors. The process can be carried out in conventional types of equipment known to the art. One may, for example, employ catalysts in the form of pills, pellets, granules, extrudates, broken fragments, or various substantial shapes, disposed as a fixed bed within a reactor, and the feedstock being reformed may be passed through the reactor in the liquid, vapor, or mixed phase, and in either upward or downward flow. Alternatively, the catalyst may be in a suitable form for use in moving beds, in which the feedstock and the catalyst are preferably passed in countercurrent flow; or in fluidized solid processes in which the feedstock is passed upward through a turbulent bed of finely divided catalyst; or in a suspensoid process, in which the catalyst is slurried in the feedstock and the resulting mixture is conveyed into the reaction zone.

In the case of a fixed bed process, the catalyst may be present in a series of beds. Therefore, it is contemplated that if only one reactor is employed in the process, that reactor may contain one catalyst bed or more than one catalyst bed. In the case of multiple catalyst beds, reheat may be supplied between catalyst beds by means known to those skilled in the art. For example, heat may be supplied to the reactor by introducing heated inert gas or heated hydrogen-containing gas into the reactor between catalyst beds. Such addition of heat will tend to compensate for the highly endothermic reaction of the dehydrogenation of naphthenes that predominates in the early portion of the catalyst. Furthermore, the heat generated by the paraffin cracking associated with the use of the improved catalyst will aid in off-setting the endothermic reaction. In the case of two reactors, one or both reactors may contain multiple catalyst beds, with or without reheat between the beds, and a reheat furnace will be employed between the reactors. These and other variations known to those skilled in the art are within the scope of the present invention and are not intended to limit the present invention.

The sole catalyst employed in this improved process is a catalyst comprising a Group VIII metal and a co-catalytic solid support. This support comprises an adsorbent refractory inorganic oxide and mordenite. Preferably, the mordenite is suspended in a matrix of the adsorbent refractory inorganic oxide. The preferred Group VIII metal is a Group VIII noble metal, advantageously, platinum. The preferred adsorbent refractory inorganic oxide is a catalytically active alumina. The Group VIII metal may be present in an amount within the range of about 0.01 to about 10 weight percent, preferably, within the range of about 0.1 to about 3.0 weight percent; the mordenite may be present in an amount within the range of about 0.5 to about 75 weight percent, preferably, within the range of about 1.0 to about 50 weight percent; and the adsorbent refractory inorganic oxide may be present in an amount within the range of about 15 to about 99.5 weight percent.

The catalyst may also contain a halogen, preferably, chloride. The halogen may be present in an amount within the range of about 0.1 to about 2.0 weight percent. Such quantities may promote the reforming reactions without causing undesirable physical or chemical effects on the catalyst or process.

The adsorbent refractory inorganic oxide base or support material advantageously comprises either gamma-alumina or eta-alumina, or mixtures of these allotropic forms. These definitions of alumina are definitions adopted as standard nomenclature by Russell in his brochure entitled "Alumina Properties," Technical Paper No. 10, 1953, Aluminum Company of America, and by Stumpf et al., IND. ENG. CHEM., 42, 1950, pages 1,398-1,403. Other adsorbent refractory inorganic oxides which may be used are, for example, silica gel, silica-alumina, magnesia-alumina, zirconia-alumina, and the like.

The aluminosilicate material that is employed in the catalytic composition of this invention is a particular form of aluminosilicate material known as mordenite. While mordenite is naturally occurring, a synthetic mordenite known as Zeolon has become available commercially from the Norton Company. Mordenite is characterized by its high silicon-to-aluminum ratio of about 5:1 or greater, and its crystal structure. Composition of mordenite, as given in Kirk-Othmer, ENCYCLOPEDIA OF CHEMICAL TECHNOLOGY, Vol. 12, The Interscience Encyclopedia Inc., New York page 294 (1954), is $(Ca, Na_2)Al_2Si_9O_{22}6H_2O$. The proposed structure is one in which the basic building block is a tetrahedron consisting of one silicon or aluminum atom surrounded by four oxygen atoms. The crystal is made up of chains of 4- and 5-membered rings of these tetrahedra. These 4- and 5-membered rings are believed to give the structure its stability. The chains are linked together to form a network having a system of large parallel channels interconnected by small cross channels. Rings of 12 tetrahedra form the large channels. Other synthetic zeolites also have such 12-membered rings, but they have interconnected cages, whereas the mordenite has parallel channels of uniform diameter. For example, synthetic faujasite, which has the formula $Na_3Al_3Si_4O_{14}$, is characterized by a 3-dimensional array of pores which consist of 12–13 A. cages interconnected through 8–9 A. windows.

The mordenite in the catalyst that is employed in the process of the present invention may be in the unexchanged cation form containing exchangeable sodium and/or calcium ions or other alkali metals or alkaline earth metals; or, preferably, the alkali metal cations may be replaced with hydrogen ions such as by exchanging the alkali metal ions with ammonium ions and then heating the exchanged material to drive off ammonia, leaving the mordenite in the hydrogen form. Mordenite differs from other aluminosilicates in that substantially all the exchangeable metal cations may be replaced with hydrogen ions without causing destruction of the characteristic crystal structure.

The catalyst that is employed in the process of this invention may be prepared by forming an adsorbent refractory co-catalytic support material comprising mordenite and an adsorbent refractory inorganic oxide and incorporating with said support material a Group VIII metal or compound thereof in an amount of about 0.01 to about 10 weight percent, based upon the weight of the catalytic composition. The finished catalyst will contain mordenite in an amount within the range of about 0.5 weight percent to about 75 weight percent and the adsorbent refractory inorganic oxide in an amount within the range of about 25 weight percent to about 99.5 weight percent, based upon the weight of the catalyst.

The catalyst composition of the present invention may be formulated in various ways. For example, finely divided mordenite alumino-silicate may be stirred into alumina sol, a soluble non-halogen Group VIII metal compound such as $(NH_3)_2 Pt (NO_2)_2$ added to the sol, the sol mixture cogelled by addition of dilute ammonia, and the resulting solid dried and calcined. Another way of preparing the catalyst composition is by mixing finely divided mordenite aluminosilicate into alumina sol as above, gelling the sol by addition of dilute ammonia to produce a gel, which is then dried and pelleted or extruded. The pellets or extrudates are than calcined, cooled and impregnated with a Group VIII metal solution. A third method, which is also suitable for making the catalyst composition of this invention, comprises blending an alumina hydrogel and finely divided mordenite aluminosilicate, adding to the resultant blend a solution of the Group VIII metal, thoroughly blending the mixture, drying the resulting gel mixture, pelleting or extruding, and calcining the pellets or extrudates. Suitable drying conditions for use in the various catalyst manufacturing methods include a temperature in the range of about 200° to 400° F. for a time in the range of about 5 to 30 hours. Suitable calcination conditions include a temperature in the range of about 900° to 1,500° F. for a time of about 2 to 20 hours. Preferred drying and calcining conditions are a temperature of about 250° F. for about 16 hours and a temperature of about 1,000° F. for about 6 hours, respectively.

A specific embodiment of the process of the present invention is presented in the accompanying figure. This figure is a simplified process flow diagram of this embodiment and, therefore, does not show auxiliary equipment, such as pumps, heat exchangers, valves, and the like. Those who are skilled in the art would recognize easily where such auxiliary equipment would be needed.

Referring to the figure, a suitable petroleum hydrocarbon feedstock is obtained from source 1. This feedstock is a hydrocrackate which boils within the range of about 180° F. to about 360° F. and contains 30.5 volume percent paraffins, 30.7 volume percent naphthenes, and 38.8 volume percent aromatics. This feedstock passes through line 2 to pump 3 at the rate of about 20,000 barrels per day (B/D). Pump 3 pumps the hydrocarbon stream through line 4, where the hydrocarbon stream is admixed with a hydrogen-containing gas stream to form a hydrogen-hydrocarbon stream. The hydrogen-containing gas stream passes from line 5 into line 4. The hydrogen-hydrocarbon stream passes from line 4 into preheat furnace 6 where it is heated to a temperature of about 960° F. The heated hydrogen-hydrocarbon stream passes from preheat furnace 6 through line 7 into the top of reactor 8.

The reactants pass through two catalyst beds in reactor 8, catalyst beds 9 and 10. Each catalyst bed contains a catalyst comprising 0.6 weight percent platinum, 0.3 weight percent chloride, about 25 weight percent Zeolon-H, and gamma-alumina. This catalyst is present as ⅛×⅛-inch pellets.

The operating conditions for reactor 8 are an inlet temperature of about 960° F., a weight hourly space velocity of about 5, a pressure of 200 psig, and a recycle gas rate of about 8,000 SCFB. Optionally, a stream of hot hydrogen-containing gas may be introduced into reactor 8 by means of line 11 between catalyst beds 9 and 10. This heated hydrogen-containing gas may be introduced into reactor 8 in order to supply heat to the hydrogen-hydrocarbon stream flowing through reactor 8 to help offset the endothermic reaction occurring therein.

The effluent from reactor 8 passes from reactor 8 through line 12 into cooler 13 where it is cooled to a temperature within the range of about 105° F. to about 120° F. The cooled effluent passes through line 14 into high pressure separator 15 where a hydrogen-containing gas is flashed from the cooled effluent. This hydrogen-containing gas passes from separator 15 through line 16 to compressor 17 to be compressed thereby. The compressed gas passes through lines 18 and 5 to line 4 where it is admixed with the hydrocarbon feedstock as described hereinabove. If needed, make-up hydrogen from source 19 may be added to the compressed hydrogen-containing gas stream in line 18 by means of line 20.

The condensed reformate minus the flashed hydrogen-containing gas passes from high pressure separator 15 through line 21 to a suitable product recovery system wherein the condensed liquid may be depropanized or debutanized and fractionated into useable fractions. Since such product recovery systems are known to those skilled in the art and since no invention is claimed in such product recovery system, it is unnecessary to describe such product recovery system in further detail.

Reformate having an unleaded research octane number in excess of 100 may be obtained at a rate of about 17,000 B/D. a yield of about 61 volume percent aromatics, based upon feed, is available. The aromatics concentration in the $C_5^+$-reformate is about 72 volume percent.

This specific embodiment of the present invention is presented for purposes of illustration only and is not intended to limit the scope of the present invention.

A specific embodiment of the present invention is presented in the following Example I and is compared to a typical reforming process employing a platinum-containing catalyst.

EXAMPLE I

A mordenite-containing reforming catalyst and a platinum-alumina-chloride catalyst were tested, individually, in an automated bench-scale pilot plant test unit. The reactor of this unit was fabricated from 1-inch-schedule 80-pipe and contained a concentrically located 0.132-inch outside-diameter thermowell. Hydrocarbon feedstock and hydrogen-containing recycle gas were combined, heated, and charged to the top of the reactor. Effluent from the reactor was cooled and flashed in a gas-liquid separator that was maintained at reactor pressure. A portion of the flash gas from the separator was dried and recycled. The remainder of the flash gas was released through a pressure control valve for reactor pressure maintenance. Liquid from the separator was charged to a low-pressure stabilizer for the production of stabilized liquid product which was submitted for various analyses. Gas from the stabilizer was combined with the separator flash gas for measurement and analyses.

The feedstock that was employed in this example was a Gulf Coast virgin naphtha that had the properties listed in Table I.

TABLE I

Feedstock Properties

Gulf Coast Virgin Naphtha

| | |
|---|---|
| Gravity, °API | 54.4 |
| ASTM Distillation, °F. | |
| IBP | 170 |
| 10% | 223 |
| 20% | 238 |
| 30% | 249 |
| 40% | 262 |
| 50% | 276 |
| 60% | 291 |
| 70% | 308 |
| 80% | 329 |
| 90% | 352 |
| EBP | 394 |
| Recovery, vol.% | 99.0 |
| Residue, vol.% | 1.0 |
| Unleaded Research Octane, CFR–R | 52.4 |
| Hydrocarbon Type, Vol. % | |
| Paraffins | 47.1 |
| Naphthenes | 40.8 |
| Aromatics | 12.1 |
| Sulfur, p.p.m. | 1.8 |
| Nitrogen, p.p.m. | 0.2 |
| Water, p.p.m. | 12 |

A typical platinum-alumina-chloride reforming catalyst was employed in a portion of these tests for comparative purposes. This catalyst will be identified hereinafter as Catalyst A. It was commercially prepared by the American Cyanamid Company and was sold as Aeroform PHF–5 catalyst. It contained 0.74 weight percent platinum and 0.88 weight percent chloride. Its surface area was 186 $M^2$/gm. This catalyst did not contain any mordenite.

As a specific embodiment of the catalyst employed in the present invention, a catalyst was prepared in the laboratory. This catalyst will be identified hereinafter as Catalyst B. Its preparation is described in the following paragraph.

A 75-gm. portion of Zeolon-H was added to 200 ml. of distilled water and thoroughly mixed therewith. Zeolon-H is the hydrogen form of a synthetically prepared mordenite structure aluminosilicate material that is manufactured by the Norton Chemical Company. To the blend of Zeolon-H and water were added 3,750 gms. of alumina sol prepared by the American Cyanamid Company (6.0 weight percent alumina). The Zeolon-H was thoroughly blended into the alumina sol. Thereafter the sol was gelled by the addition of 2 liters of a 10 percent ammonium hydroxide solution. The gel was dried at 250° F. overnight in air. The air flow rate for this drying and subsequent dryings and calcinings was about 1.5 cubic feet per hour. The dried material was then mixed with Sterotex (4 weight percent) and the resulting material was pelleted into ⅛×⅛-inch pellets. The pellets were then calcined at a temperature of 1,000° F. for 6 hours in air. A 293-gm. portion of the calcined pellets was impregnated with a solution that had been prepared by dissolving 4.4 gms. of $H_2PtCl_6$ and 87 gms. of $Al(NO_3)_3$ in 200 ml. of distilled water. The impregnated pellets were then dried in air for 3 hours at 250° F. and calcined for 4 hours in air at a temperature of 1,000° F.

Catalyst B was prepared to contain 0.6 weight percent platinum and about 25 weight percent Zeolon-H. It was found to contain 0.27 weight percent chloride and possessed a surface area of 274 $M^2$/gm.

Each of the above two catalysts was charged individually to the above-described reactor. In each test, a single reactor containing a single catalyst bed was employed and was operated adiabatically. The following operating conditions were employed: a pressure of 300 psig; a recycle gas rate of about 4,800 SCFB to about 5,500 SCFB; an inlet hydrogen partial pressure of about 179 psig to about 240 psig; a weight hourly space velocity of about 6 to about 14 gms. of hydrocarbon per hour per gm. of catalyst; and an inlet temperature of 900° F.

The test employing Catalyst B was a specific embodiment of the improved reforming process of the present invention.

The data obtained from these tests are presented in Table II.

The results of these tests indicate that the reforming process of the present invention, i.e., the reforming tests employing Catalyst B, produced as many aromatics from naphthenes as were produced with the typical reforming process, but did not cyclize any paraffins. Moreover, the embodiment of the present invention produced a slightly higher yield of $C_4^+$-reformate, a higher octane reformate, about one-half as much polymer, and an appreciably larger aromatics concentration in TABLE II.—Test Results

| Catalyst | A | A | A | A | A | A | B | B | B | B | B | B |
|---|---|---|---|---|---|---|---|---|---|---|---|---|
| Cumulative Hours on Oil | 3.5 | 6.6 | 12.5 | 17.1 | 24.0 | 31.1 | 7.9 | 16.1 | 24.4 | 32.6 | 40.9 | 46.5 |
| Pressure, p.s.i.g. | 300 | 300 | 300 | 300 | 300 | 300 | 300 | 300 | 300 | 300 | 300 | 300 |
| Recycle Gas Rate, SCFB | 5101 | 5107 | 4955 | 4982 | 5106 | 5027 | 5372 | 5363 | 5486 | 5331 | 5345 | 4797 |
| Weight Hourly Space Vel. | 13.80 | 13.89 | 6.05 | 6.03 | 9.71 | 9.92 | 9.01 | 9.41 | 9.15 | 9.58 | 9.55 | 10.46 |
| Inlet Temperature, °F | 900 | 900 | 900 | 900 | 900 | 900 | 900 | 900 | 900 | 900 | 900 | 900 |
| Yields, Volume Percent: | | | | | | | | | | | | |
| C4's and C5's | 0.6 | 0.9 | 0.7 | 0.5 | 0.3 | 0.5 | 15.03 | 19.10 | 14.94 | 14.24 | 13.67 | 13.03 |
| $C_6^+$ | 96.3 | 95.9 | 96.0 | 96.6 | 96.6 | 96.2 | 81.18 | 79.47 | 82.44 | 83.58 | 84.20 | 85.03 |
| Polymer | 1.8 | 1.8 | 1.8 | 1.8 | 1.8 | 1.9 | 1.09 | 1.02 | 1.10 | 1.09 | 1.01 | 1.16 |
| $C_5^+$ | 96.9 | 96.5 | 96.7 | 97.3 | 97.1 | 96.8 | 90.02 | 86.76 | 89.14 | 89.79 | 90.22 | 90.72 |
| Total aromatics | 32.5 | 31.7 | 32.0 | 32.0 | 31.9 | 31.7 | 36.33 | 33.95 | 33.40 | 32.86 | 31.88 | 32.80 |
| $C_6^+$ paraffin conversion, mole % | | | | | | | 28.4 | 27.7 | 22.4 | 19.6 | 18.1 | 18.7 |
| $C_6^+$ naphthene conversion, mole % | 54.0 | 52.1 | 53.7 | 52.3 | 52.2 | 51.4 | 62.3 | 60.7 | 59.9 | 57.7 | 57.0 | 57.0 |
| Aromatics Conc. in $C_6^+$, vol. % | 33.7 | 33.1 | 33.3 | 33.1 | 33.0 | 33.0 | 44.8 | 42.7 | 40.5 | 39.3 | 37.9 | 38.6 | the $C_6^+$-reformate than those obtained with the typical reforming process. Since there was no appreciable cyclization of paraffins by the reforming process of the present invention, such operation might be unattractive for the reforming of high paraffin feedstocks. However, such operation should prove attractive for the conversion of intermediate and relatively low-paraffin feedstocks, particularly those low-paraffin feedstocks such as hydrocracked or catalytically cracked naphthas, which provide aromatics primarily from naphthenes.

EXAMPLE II

The test that employed Catalyst B in Example I was continued for a longer period of time than that shown in Table II. This part of the test was made to demonstrate that the proper selection of conditions could be used to provide improved aromatics concentrations. The data obtained from this portion of the test are presented in Table III.

TABLE III

Additional Test Results

| Catalyst | B | B | B | B |
|---|---|---|---|---|
| Cumulative Hours on Oil | 54.4 | 62.4 | 74.1 | 82.9 |
| Pressure, p.s.i.g. | 120 | 120 | 120 | 300 |
| Recycle Gas Rate, SCFB | 13,752 | 14,061 | 13,919 | 2444 |
| Weight Hourly Space Vel. | 4.97 | 4.97 | 5.05 | 19.75 |
| Inlet Temperature, °F. | 900 | 900 | 960 | 960 |
| Yields, Vol. % | | | | |
| C4's and C5's | 12.2 | 14.8 | 20.7 | 18.8 |
| $C_6^+$ | 84.1 | 82.0 | 74.2 | 77.4 |
| polymer | 1.4 | 1.4 | 1.5 | 1.0 |
| total aromatics | 41.1 | 42.1 | 44.7 | 36.8 |
| $C_6^+$ paraffin conversion | 23.9 | 26.8 | 43.8 | 32.7 |
| $C_6^+$ naphthene conversion | 75.3 | 78.0 | 85.2 | 70.1 |
| Research Octane Nos. | | | | |
| $C_5^+$ reformate | 84.4 | 84.0 | 90.8 | |
| Aromatics Concentration in $C_6^+$ yield, vol. % | 48.9 | 51.3 | 60.3 | 47.5 |

Comparison of the data in Table II with that in Table III reveals that a reduction in pressure (from about 300 psig to 120 psig) coupled with an increase in recycle gas rate (from about 5,000 SCFB to about 14,000 SCFB) and a reduction in WHSV (from about 9 to about 5) results in an appreciable increase in aromatics concentration. Moreover, if the inlet temperature is also increased (from 900° to 960° F.), there is an additional increase in aromatics concentration. Even when the weight hourly space velocity is increased from about 10 to about 19.7 with a corresponding reduction in recycle gas rate (from 5,000 SCFB to about 2,500 SCFB) and the temperature is increased (from 900° to 960° F.), the aromatics concentration is increased substantially.

The above examples are presented for illustrative purposes only and are not intended to limit the scope of the present invention.

What is claimed is:

1. A process for reforming a petroleum hydrocarbon feedstock that boils within the range of about 120° F. to about 500° F. and is selected from the group consisting of virgin naphthas, cracked naphthas, catalytic gasolines, coker naphthas, and mixtures thereof, which process comprises contacting said feedstock in a reactor system consisting of two reactors in the presence of hydrogen and under reforming conditions with a catalyst in each reactor comprising a Group VIII noble metal and a co-catalytic solid support, said support comprising a non aluminosilicate adsorbent refractory inorganic oxide and mordenite, and said contacting being carried out at a weight hourly space velocity of at least 5 weight units of hydrocarbon per hour per weight unit of catalyst.

2. The process of claim 1 wherein said feedstock has a relatively high concentration of a member selected from the group consisting of aromatics, naphthenes, and mixtures thereof.

3. The process of claim 1 wherein said mordenite of said support is suspended in a porous matrix of said adsorbent refractory inorganic oxide.

4. The process of claim 2 wherein said refractory inorganic oxide is a catalytically active alumina that is selected from the group consisting of gamma-alumina, eta-alumina, and mixtures thereof.

5. The process of claim 2 wherein said catalyst comprises 0.01 to 10 weight percent Group VIII metal, 0.5 to 75 weight percent mordenite, and about 15 to about 99.5 weight percent refractory inorganic oxide.

6. The process of claim 2 wherein said reforming conditions, in addition to a weight hourly space velocity of at least 5 weight units of hydrocarbon per hour per weight unit of catalyst, comprise an inlet temperature within the range of about 700° F. to about 1,100° F., a pressure ranging from atmospheric pressure to about 1,000 psig, and a recycle gas rate within the range of about 1,000 SCFB to about 20,000 SCFB.

7. The process of claim 2 wherein said reforming conditions comprise an inlet temperature within the range of about 850° F. to about 1,050° F., a pressure within the range of about 50 psig to about 500 psig, a weight hourly space velocity of at least 9 weight units of hydrocarbon per hour per weight unit of catalyst, and a recycle gas rate within the range of about 3,000 SCFB to about 10,000 SCFB.

8. The process of claim 2 wherein said catalyst contains also about 0.1 to about 2.0 weight percent chloride.

9. The process of claim 2 wherein said mordenite of said support is suspended in a porous matrix of said adsorbent refractory inorganic oxide.

10. The process of claim 2 wherein said Group VIII noble metal of said catalyst is platinum.

11. The process of claim 4 wherein said catalyst comprises 0.01 to 10 weight percent Group VIII noble metal, 0.5 to 75 weight percent mordenite, and about 15 to about 99.5 weight percent catalytically active alumina.

12. The process of claim 2 wherein said feedstock contains nitrogen, sulfur, and olefinic compounds.

13. The process of claim 9 wherein said catalyst contains also about 0.1 to about 2.0 weight percent chloride.

14. The process of claim 11 wherein said Group VIII noble metal of said catalyst is platinum.

15. The process of claim 11 wherein said reforming conditions, in addition to a weight hourly space velocity of at least 5 weight units of hydrocarbon per hour per weight unit of catalyst, comprise an inlet temperature within the range of about 700° F. to about 1,100° F., a pressure ranging from atmospheric pressure to about 1,000 psig, and a recycle gas rate within the range of about 1,000 SCFB to about 20,000 SCFB.

16. The process of claim 11 wherein said reforming conditions comprise an inlet temperature within the range of about 850° F. to about 1,050° F., a pressure within the range of about 50 psig to about 500 psig, a weight hourly space velocity of at least 9 weight units of hydrocarbon per hour per weight unit of catalyst, and a recycle gas rate within the range of about 3,000 SCFB to about 10,000 SCFB.

17. The process of claim 6 wherein said mordenite of said support is suspended in a porous matrix of said adsorbent refractory inorganic oxide.

18. The process of claim 6 wherein said feedstock contains nitrogen, sulfur, and olefinic compounds.

19. The process of claim 14 wherein said catalyst contains also about 0.1 to about 2.0 weight percent chloride.

20. The process of claim 14 wherein said reforming conditions, in addition to a weight hourly space velocity of at least 5 weight units of hydrocarbon per hour per weight unit of catalyst, comprise an inlet temperature within the range of about 700° F. to about 1,100° F., a pressure ranging from atmospheric pressure to about 1,000 psig, and a recycle gas rate within the range of about 1,000 SCFB to about 20,000 SCFB.

21. The process of claim 14 wherein said reforming conditions comprise an inlet temperature within the range of about 850° F. to about 1,050° F., a pressure within the range of about 50 psig to about 500 psig, a weight hourly space velocity of at least 9 weight units of hydrocarbon per hour per weight unit of catalyst, and a recycle gas rate within the range of about 3,000 SCFB to about 10,000 SCFB.

22. The process of claim 15 wherein said mordenite of said support is suspended in a porous matrix of said adsorbent refractory inorganic oxide.

23. The process of claim 20 wherein said mordenite of said support is suspended in a porous matrix of said adsorbent refractory inorganic oxide.

* * * * *